US012728748B2

(12) United States Patent
de Castro Bonfim et al.

(10) Patent No.: US 12,728,748 B2
(45) Date of Patent: Sep. 8, 2026

(54) DRIVER ASSISTANCE SYSTEM AND METHOD FOR AUTOMATIC MANEUVERING WITH REPETITION OF A MANUALLY DRIVEN ROUTE TAKING INTO ACCOUNT A DEVIATING DESIRED TARGET POSITION AND/OR DESIRED TARGET ORIENTATION

(71) Applicant: Bayerische Motoren Werke Aktiengesellschaft, Munich (DE)

(72) Inventors: Sonja de Castro Bonfim, Munich (DE); Joachim Fleig, Munich (DE); Elisabeth Orthuber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 933 days.

(21) Appl. No.: 17/269,806

(22) PCT Filed: Jul. 24, 2019

(86) PCT No.: PCT/DE2019/100677
§ 371 (c)(1),
(2) Date: Feb. 19, 2021

(87) PCT Pub. No.: WO2020/038520
PCT Pub. Date: Feb. 27, 2020

(65) Prior Publication Data

US 2021/0316629 A1 Oct. 14, 2021

(30) Foreign Application Priority Data

Aug. 20, 2018 (DE) ..................... 10 2018 213 968.7

(51) Int. Cl.
*B60L 53/38* (2019.01)
*B60L 15/20* (2006.01)
(Continued)

(52) U.S. Cl.
CPC ............... *B60L 53/38* (2019.02); *B60L 15/20* (2013.01); *B60L 53/12* (2019.02); *B60L 53/36* (2019.02);
(Continued)

(58) Field of Classification Search
None
See application file for complete search history.

(56) References Cited

U.S. PATENT DOCUMENTS

2013/0158774 A1 6/2013 Schmidt et al.
2014/0095021 A1 4/2014 Tate et al.
(Continued)

FOREIGN PATENT DOCUMENTS

DE 10 2011 121 722 A1 6/2013
DE 10 2013 015 348 A1 4/2014
(Continued)

OTHER PUBLICATIONS

International Search Report (PCT/ISA/210) issued in PCT Application No. PCT/DE2019/100677 dated Oct. 9, 2019 with English translation (six (6) pages).
German-language Written Opinion (PCT/ISA/237) issued in PCT Application No. PCT/DE2019/100677 dated Oct. 9, 2019 (nine (9) pages).
(Continued)

*Primary Examiner* — Angela Y Ortiz
*Assistant Examiner* — Laura E Linhardt
(74) *Attorney, Agent, or Firm* — Crowell & Moring LLP

(57) ABSTRACT

A driver assistance system for the automatic maneuvering of a motor vehicle is designed to determine a driving trajectory in a recording process based on a route which is manually driven by the driver with the motor vehicle, and on the basis of the previously determined driving trajectory, to maneuver the motor vehicle with at least automatic lateral guidance. The driver assistance system is configured to detect, during the recording process, the existence of a desired target position and/or a desired target orientation of the motor
(Continued)

vehicle. Alternatively, the driver assistance system receives information about a desired target position and/or a desired target orientation of the motor vehicle, via a user interface. During the repetition process, the motor vehicle is maneuvered with at least automatic lateral guidance such that the motor vehicle assumes the desired target position or desired target orientation by the end of the repetition process.

9 Claims, 6 Drawing Sheets

(51) Int. Cl.
*B60L 53/12* (2019.01)
*B60L 53/36* (2019.01)
*B62D 15/02* (2006.01)
*G08G 1/16* (2006.01)

(52) U.S. Cl.
CPC ...... *B62D 15/0285* (2013.01); *B60L 2260/32* (2013.01); *G08G 1/168* (2013.01)

(56) References Cited

U.S. PATENT DOCUMENTS

| | | | | |
|---|---|---|---|---|
| 2017/0067753 | A1 | 3/2017 | Peer | |
| 2017/0136892 | A1* | 5/2017 | Ricci | H02J 50/10 |
| 2018/0265130 | A1 | 9/2018 | Derendarz et al. | |
| 2021/0284131 | A1* | 9/2021 | Max | G05D 1/0214 |

FOREIGN PATENT DOCUMENTS

| | | | |
|---|---|---|---|
| DE | 10 2013 217 623 | A1 | 4/2014 |
| DE | 10 2013 207 907 | A1 | 10/2014 |
| DE | 10 2013 209 764 | A1 | 11/2014 |
| DE | 10 2013 223 417 | A1 | 6/2015 |
| DE | 10 2014 209 678 | A1 | 11/2015 |
| DE | 10 2015 011 710 | A1 | 3/2017 |
| DE | 10 2016 211 180 | A1 | 3/2017 |
| GB | 2500691 | A | 10/2013 |

OTHER PUBLICATIONS

German-language Search Report issued in German Application No. 10 2018 213 968.7 dated May 8, 2019 with partial English translation (14 pages).

* cited by examiner

DRIVER ASSISTANCE SYSTEM AND METHOD FOR AUTOMATIC MANEUVERING WITH REPETITION OF A MANUALLY DRIVEN ROUTE TAKING INTO ACCOUNT A DEVIATING DESIRED TARGET POSITION AND/OR DESIRED TARGET ORIENTATION

BACKGROUND AND SUMMARY OF THE INVENTION

The invention relates to a driving system for automated maneuvering and to a corresponding method for automated maneuvering. In this context, a driving trajectory is determined in a recording process based on a route which is manually driven along by the driver with the motor vehicle. In a repetition process, the motor vehicle is maneuvered with at least automated lateral guidance on the previously determined driving trajectory.

Such a system is known, for example, from document DE 10 2013 223 417 A1 and from the contribution "HomeZone—Automatische Querführungsassistenz für alltäglich wiederkehrende Fahrhandlungen des ruhenden Verkehrs [HomeZone—Automatic lateral guidance assistance for everyday occurring driving actions in stationary traffic]", Dr. Holger Mielenz et al., in the conference proceedings "AAET—Automatisierungssysteme, Assistenzsysteme and eingebettete Systeme für Transportmittel [AAET—Automation systems, assistance systems and embedded systems for transportation means]", 14$^{th}$ Braunschweiger Symposium of Feb. 6 and 7, 2013, Braunschweig.

Such systems are known from documents DE 10 2013 209 764 A1, DE 10 2014 209 678 A1 and DE 10 2011 121 722 A1.

In such systems, the driver can store an executed maneuver. By means of a self-locating process the driver assistance system can detect, for example, if it is located at the starting point for a stored maneuver and can make the driver an offer to execute this maneuver automatically. There can also be provision that during the automatically executed maneuver (also referred to as a replication) the driver assistance system keeps as precisely as possible to the maneuvers predefined by the driver insofar as the surroundings of the vehicle permit it.

A disadvantage with systems known from the prior art is that, in the recording process, the driver has to precisely approach the desired target position manually so that, in the repetition process, the driver assistance system maneuvers the vehicle in such a way that this target position is reached again.

An example of a target position which has to be approached precisely in a manual fashion in the recording process and in an automated fashion in the repetition process is the position of a vehicle-external charging interface for charging an electrical energy store (e.g. a battery) of an electrically operated motor vehicle (e.g. electric vehicle or hybrid vehicle) with electrical energy. In fact, vehicle-external charging stations are known in which the driver has to position the vehicle with sufficient precision at a charging interface of the charging station, and under certain circumstances suitable orientation has to be maintained between the vehicle and the charging interface. In such charging stations, the driver does not have to connect a charging cable manually to a vehicle-side connection and/or to a charging-station-side connection after the driver has parked the vehicle at a charging location at the charging station. Examples of this are charging stations with a cableless charging interface, for example an inductive charging interface, or with a conductive charging interface with charging robotics, in which the charging robotics (for example a pivotable arm) establishes an electrical charging contact between the vehicle and the charging interface. In one variant of an inductive charging interface which is frequently found, a vehicle-external ground coil is arranged on the ground, while a vehicle-side coil is arranged on the underside of the vehicle. The transmission of energy takes place by means of magnetic coupling of the two coils. For the efficient transmission of energy, the vehicle must be moved into a charging position in which the secondary coil is positioned on the motor vehicle as precisely as possible above the primary coil. During the recording process, the driver must position the vehicle within a degree of positioning accuracy and, depending on the configuration of the vehicle-external charging interface, also with a predefined orientation at a charging position of the charging interface. The driver must move into congruence two points which cannot be seen directly, or can only be seen with difficulty (specifically the charging interface on the vehicle and the charging interface of the charging device). For example, in the case of a charging coil (which can be driven over) which lies on the ground, of an inductive charging interface or a charging interface which lies on the ground and has charging robotics, the charging interface of the charging device must be moved into congruence in the X and Y directions with a charging interface which is located on the vehicle.

The object of the invention is to improve known driver assistance systems and methods for automated maneuvering with repetition of a manually driven-along route in such a way that the driver does not have to approach a target position precisely and/or does not have to reach a target orientation precisely so that, for example, the convenience for the driver is increased.

The object is achieved by the features of the independent patent claims. Advantageous embodiments are described in the dependent claims. It is to be noted that additional features of a patent claim which is dependent on an independent patent claim can form a separate invention, which is independent of the combination of all the features of the independent patent claim and which can be made the subject matter of an independent claim of a partial application or of a subsequent application, without the features of the independent patent claim or only in combination with a subset of the features of the independent patent claim. This applies in the same way to technical teachings which are described in the description and can form an invention which is independent of the features of the independent patent claims.

An aspect of an invention relates to a driver assistance system for automated maneuvering with at least automated lateral guidance for a motor vehicle (e.g. passenger car), in particular with automated lateral and longitudinal guidance.

The system is configured to carry out various activities which are described below. This occurs, typically, by means of an electronic control unit which can also be distributed by means of a plurality of control devices. The control unit can comprise one or more processors which operate in an inventive fashion under the control of one or more software programs.

The driver assistance system is configured to determine a driving trajectory in a recording process based on a route which is manually driven along by the driver with the motor vehicle and at the end of which the vehicle is located at an actual target position with an actual target orientation, and typically also to store the trajectory and to maneuver the motor vehicle with at least automated lateral guidance in a repetition process based on the previously determined driving trajectory. The trajectory comprises, for example, the respective X/Y position, the respective yaw angle and the respective curvature over time or over distance. Depending on the implementation of the driving assistance system, there can be provision that, during the automated maneuvering, the driver is located at the driver's operating location in the vehicle or outside the vehicle.

The driver assistance system according to the invention is characterized in that it is configured to automatically detect the presence of a setpoint target position and/or setpoint target orientation of the motor vehicle, in the recording process, in particular at the end of the manually driven-along route at the actual target position with the actual target orientation of the vehicle. In this context, the vehicle has preferably already stopped. Taking into account the setpoint target position or setpoint target orientation can be optionally be subject to the condition that information about the setpoint target position or setpoint target orientation has sufficiently high confidence or accuracy.

It would also alternatively be conceivable that the driver assistance system receives, via a user interface, information about a setpoint target position and/or setpoint target orientation of the motor vehicle for the correction of the actual target position or actual target orientation. In this context, the vehicle has preferably already stopped.

Then, preferably taking into account the setpoint target position or setpoint target orientation, such a driving trajectory is determined that the motor vehicle is in the setpoint target position or setpoint target orientation at the end of the repetition process. This driving trajectory can then be stored and used in the repetition process for guiding the vehicle.

In the repetition process, the motor vehicle is maneuvered with at least automated lateral guidance in such a way that, at the end of the repetition process, the motor vehicle is in the setpoint position and/or setpoint orientation.

The driver assistance system according to the invention offers the advantage that the driver does not have to approach this setpoint target position precisely and/or does not have to precisely reach a target orientation precisely, so that, for example, the convenience for the driver is increased.

In the case of a setpoint target position for positioning the vehicle at a charging interface, a high stopping accuracy is generally expected in order to ensure a high level of energy efficiency during the charging process. The driver assistance system according to the invention offers the driver a significant gain in convenience if such precise positioning of the vehicle at the charging position is not required during the recording of the manually driven-along route.

At the end of the manually driven-along route, it is preferably checked, at the actual target position with the actual target orientation of the vehicle, whether a setpoint target position and/or setpoint target orientation of the motor vehicle is present. However, in this case, the setpoint target position and/or setpoint target orientation may already be known earlier to the driver assistance system, for example may be received from the outside, for example during the approach to the target position (e.g. 4 m before the target position). It would even be conceivable to also check, even before the end of the manually driven-along route, whether a setpoint target position of the motor vehicle is present, and, in the positive case, then no longer to take into account at all the manually driven-along residual distance up to the actual target position.

The setpoint target position and/or setpoint target orientation is preferably a setpoint target position or setpoint target orientation for positioning the motor vehicle at a vehicle-external charging interface or vehicle-external charging device, in particular at an inductive charging interface or at a charging interface with charging robotics.

However, it would also be conceivable that the setpoint target position or setpoint target orientation is an improved target position or improved target orientation when parking at a parking location (e.g. a parking space or a garage) without a vehicle-external charging interface being located at the parking location. For example, by evaluating the surroundings (e.g. evaluation of objects, such as other vehicles, walls or a garage or ground markings, which bound the parking location) in the non-optimum actual target position/actual target orientation that the vehicle is not positioned in an optimum way and/or is not oriented in an optimum way. In this case, the presence of a setpoint target position and/or setpoint target orientation is determined, and is then taken into account for the repetition process.

By preferably taking into account both the recorded manually driven-along distance and the setpoint target position or setpoint target orientation, such a driving trajectory is determined that, at the end of the repetition process, the motor vehicle is in the setpoint target position or setpoint target orientation. This driving trajectory can then be stored and then used in the repetition process to maneuver the vehicle in an automated fashion such that, at the end of the repetition process, the motor vehicle is in the setpoint target position and/or setpoint target orientation.

However, it would also alternatively be conceivable that a non-adapted driving trajectory is stored without taking into account the setpoint target position and/or setpoint target orientation based on the manually driven-along route, and in addition the setpoint target position or setpoint target orientation is stored. Within the scope of the repetition process, it is then possible to determine, on the basis of the stored, non-adapted driving trajectory and the stored setpoint target position or setpoint target orientation, a driving trajectory which is adapted (with respect to the stored driving trajectory) and which takes into account the stored setpoint target position and/or setpoint target orientation.

During the advantageous embodiment which is described above, it is assumed that the presence of a setpoint target position of the motor vehicle has been detected or information about the setpoint target position has been received via a user interface. In addition, the presence of a setpoint target orientation for the setpoint target position can be optionally detected, or corresponding information for the correction of the orientation can be received via the user interface.

The driver assistance system is configured to detect, at the end of the manually driven-along route at the actual target position with the actual target orientation, that the setpoint target position is located in a defined surrounding area around the actual target position. In an alternative implementation, the driver assistance system could detect, at the end of the manually driven-along route at the actual target position with the actual target orientation, that the actual target position is located in a defined surrounding area around the setpoint target position. This surrounding area around the actual target position or around the setpoint target position is, for example, in terms of absolute value, less than or less than or equal to a first threshold value as a result of an offset in the longitudinal direction of the vehicle, and defines an offset in the vehicle lateral direction which, in terms of absolute value, is less than or less than or equal to the first threshold value or a second threshold value. For example, the first threshold value is 50 cm.

If it has been detected that the setpoint target position is located in the defined surrounding area around the actual target position (or the actual target position is located in the defined surrounding area around the setpoint target position), the motor vehicle is maneuvered with at least automated lateral guidance in such a way that, at the end of the repetition process, the motor vehicle is in the setpoint target position and/or the setpoint target orientation.

If it has been detected that the setpoint target position is located in the defined surrounding area around the actual target position (or the actual target position is located in the defined surrounding area around the setpoint target position), for example by taking into account the setpoint target position or setpoint target orientation, such a driving trajectory is determined that, at the end of the repetition process, the motor vehicle is in the setpoint target position or setpoint target orientation.

If, for example, at the end of the recording process, the user has stopped and would like to end the recording, the driver assistance system checks, for example, whether a target specification is present (e.g. position of a vehicle-external charging interface) which is located in the defined area around the actual target position. The trajectory which is to be stored is then adapted automatically in accordance with the setpoint target position and/or setpoint target orientation, under certain circumstances taking into account one or more boundary conditions (e.g. optimizations of the trajectory or obstacle information about obstacle objects in the surroundings).

For the following example it is assumed that the setpoint target position and/or setpoint target orientation is a setpoint target position or setpoint target orientation for the positioning of the motor vehicle at a vehicle-external charging interface of a vehicle-external charging device. For example, the setpoint target position is the position of a ground coil.

In order to check whether the setpoint target position is located in a defined surrounding area around the actual target position, at least two embodiment variants are contemplated:

1. According to a first variant, the setpoint target position is the position of the vehicle-external charging interface (e.g. position of the ground coil, in particular of the center of the ground coil) and the actual target position is the position of a vehicle-internal charging interface (e.g. the vehicle coil, in particular the center of the vehicle coil) which is to be coupled to the vehicle-external charging interface. In this case, it can be checked whether the position of the vehicle-external charging interface lies in a defined surrounding area around the position of the vehicle-internal charging interface.
2. According to a second variant, the actual target position is the position of a reference point of the vehicle (for example the center of the rear axle). For example the driving trajectory is referred to this reference point, i.e. the driving trajectory describes the travel of this reference point. The setpoint target position is a shifted position of the vehicle-external charging interface which is shifted by the offset between the position of the vehicle-internal charging interface and the reference position. Alternatively, the setpoint target position is a shifted position of the reference point, which position is shifted by the offset between the position of the vehicle-internal charging point and the position of the vehicle-external charging point. In this case, it can be checked whether the shifted position of the vehicle-external charging interface or the shifted position of the reference point lies in a defined surrounding area around the position of the reference point of the vehicle.

A setpoint target position and/or setpoint target orientation can be taken into account subject to the condition of user-side consent: insofar as the presence of a setpoint target position and/or setpoint target orientation is automatically detected in the recording process, for example at the end of the manually driven-along route at the actual target position with the actual target orientation, adaptation to the setpoint target position or setpoint target orientation can preferably be offered to the user via a user interface. Insofar as the user-side acceptance of the offer for adaptation to the setpoint target position or setpoint target orientation is detected by the system, the vehicle is maneuvered in such a way that, at the end of the repetition process, the motor vehicle is in the setpoint target position or setpoint target orientation.

A second aspect of the invention relates to a method for the automated maneuvering of a motor vehicle with at least automated lateral guidance which has the following steps:

- determining, in a recording process, a driving trajectory based on a route which is manually driven along by the driver with the motor vehicle and at the end of which the motor vehicle is located at an actual target position with an actual target orientation, and
- in a repetition process, maneuvering the motor vehicle based on the previously determined driving trajectory with at least automated lateral guidance.

In contrast to known methods, the method according to the invention is characterized by the further steps:

- in the recording process, in particular at the end of the manually-driven along route at the actual target position with the actual target orientation of the vehicle,
- automatically detecting the presence of a setpoint target position and/or setpoint target orientation of the motor vehicle, or
- receiving information about a setpoint target position and/or setpoint target orientation of the motor vehicle for the correction of the actual target position or actual target orientation, via a user interface, and
- maneuvering the motor vehicle in the repetition process with at least automated lateral guidance in such a way that, at the end of the repetition process, the motor vehicle is in the setpoint target position or setpoint target orientation.

The statements above relating to the inventive system according to the first aspect of the invention correspondingly also apply to the inventive method according to the second aspect of the invention. Advantageous exemplary embodiments of the method according to the invention, which are not explicitly described at this point or in the patent claims, correspond to the advantageous exemplary embodiments of the system according to the invention, which are described above or described in the patent claims.

The invention is described below on the basis of an exemplary embodiment and with reference to the appended drawings.

DETAILED DESCRIPTION OF THE DRAWINGS

Figure 1:
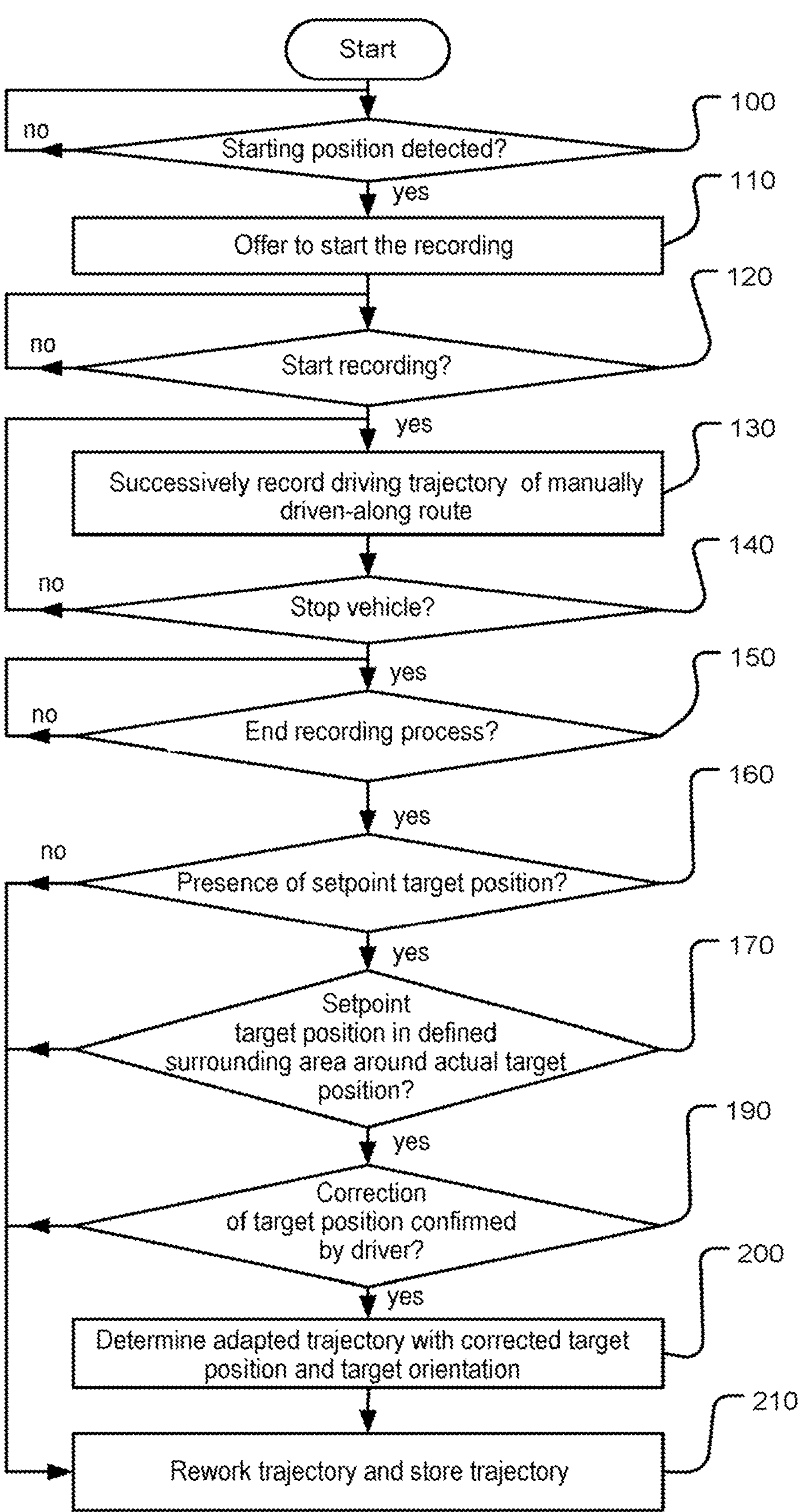
FIG. 1 is a flow diagram of the function of an exemplary embodiment of a driver assistance system according to the invention with respect to the recording process.
Figure 2:
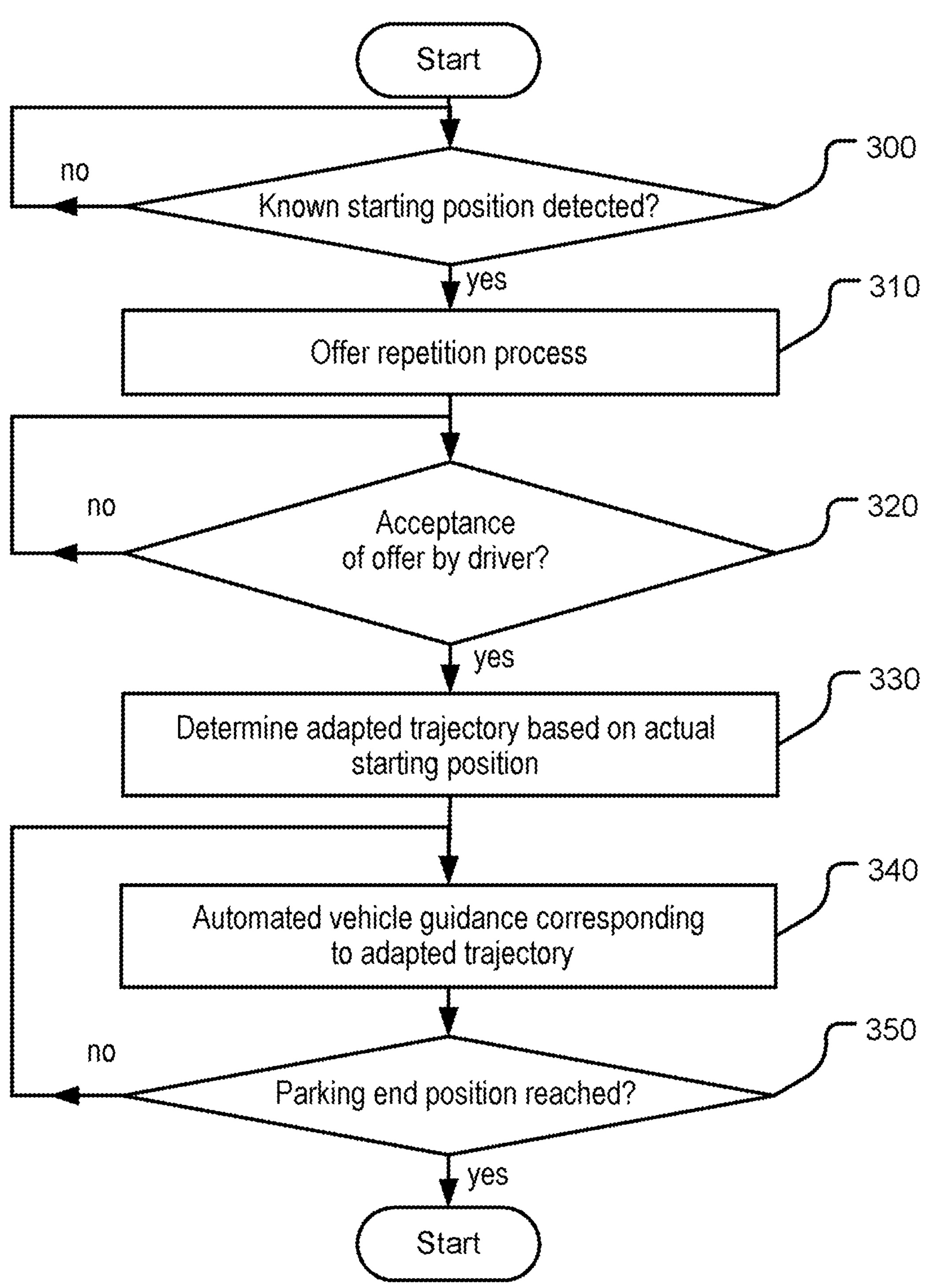
FIG. 2 is a flow diagram of the function of an exemplary embodiment of a driver assistance system according to the invention with respect to the repetition process.

FIG. 1 and FIG. 2 show simplified flow diagrams of the function of an exemplary embodiment of a driver assistance system according to the invention. To be precise, FIG. 1 shows this with respect to the recording process and FIG. 2 shows this with respect to the repetition process. It is assumed below that the setpoint target position for the correction of the actual setpoint target position after manually driving along a route is a setpoint charging position for positioning the vehicle at a vehicle-external charging interface, for example for positioning a vehicle-side coil above a ground coil.

Figure 3:
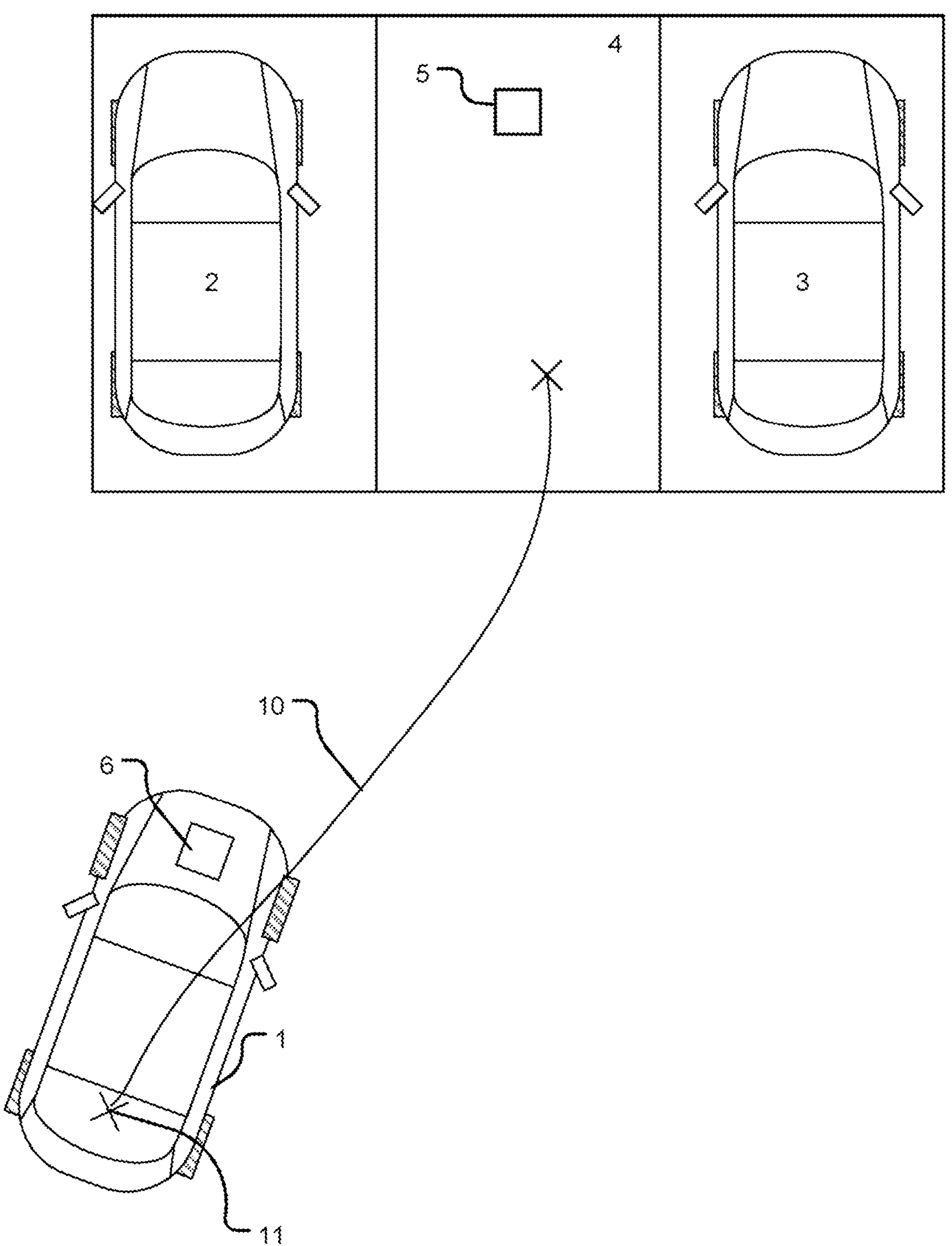
FIG. 3 shows an exemplary starting position of the vehicle at the start of the recording process and an exemplary route which is manually driven along by the driver with the motor vehicle, during the recording process.

In order to record a new trajectory according to FIG. 1, the driver steers the vehicle 1 manually into a desired starting position and stops the vehicle. In FIG. 3, the vehicle 1 is located with its vehicle-side charging interface 6 (e.g. a vehicle coil in the case of an inductive charging interface) in the starting position before a charging parking location 4 (here a forward parking space or diagonal parking space with the lateral boundary vehicles 2 and 3). The charging parking location 4 comprises a charging interface 5 (e.g. a ground coil) of a charging station, wherein, for charging the vehicle 1, it has to be positioned at the vehicle-external charging interface 6 in such a way that the vehicle-side charging interface 6 is positioned with sufficient precision centrally above the vehicle-external charging interface 5 (for example the center of a vehicle coil is then positioned above the center of the ground coil).

If the vehicle has been stopped in the starting position, the vehicle attempts to identify characteristic features of the surroundings (e.g. of the building, vegetation and other immobile objects) of the vehicle by means of the detection of the surroundings in the desired starting position. In the interrogation 100 in FIG. 1, it is checked whether a valid starting position has been successfully detected. If this is the case, in step 110 the driver is provided with an offer, via the user interface in the vehicle cockpit, to start the recording of the subsequently manually driven-along route. If the system detects in the interrogation 120 that the driver has accepted the offer by means of an operator control action (e.g. activation of a push button key), the recording is started. In this context, in step 130 the driving trajectory of the manually driven-along route is recorded successively. The trajectory comprises, for example, the respective X/Y position, the respective yaw angle and the respective curvature in relation to subsequently following times or route points. In FIG. 3, the trajectory 10 of the manually driven-along route is illustrated. The trajectory is relative to a specific reference point 11 of the vehicle, for example to the center of the rear axle.

Insofar as it is detected in the interrogation 140 that the vehicle has been stopped, it is checked in the interrogation 150 whether the driver would like to end the recording (after a corresponding request) by means of a corresponding operator control action in the vehicle cockpit (for example activation of an operator control push button key).

If the interrogation 150 receives a positive reply, the system checks in the interrogation 160 whether a setpoint target position is present or not. The setpoint target position can be a position for charging. This is, for example, the position of a vehicle-external charging interface 5.

In the starting position in FIG. 1, the position of the charging interface 5 is, for example, not yet known to the system owing to the large distance between the charging interface 5 and the vehicle 1. Information about the position of the charging interface 5, which is sent by a vehicle-external transmitter, is not received in this exemplary embodiment until the motor vehicle 1 approaches the charging interface 5, after the position of the vehicle 1 with respect to the position of the charging interface 5 has been determined by the charging device. In addition to the position information, information about the angle φ between the current longitudinal orientation of the vehicle 1 and the longitudinal orientation which is to be assumed by the vehicle 1 in the charging position at the charging interface 5 is also received. For example, a WLAN (wireless local area network) communication link can be used for the transmission of information. For the vehicle-external measurement of the position of the vehicle 1 with respect to the position of the charging interface 5, there is provision, for example during the recording process, that the vehicle 1 continuously emits a radio signal which is received by a plurality of receivers of the charging interface 5 which are located at different locations. The position of the vehicle 1 can be determined by the charging device from this by means of a triangulation method.

There is preferably provision that position information for a charging interface 5 of a charging device is received only if this charging interface or its charging device has already previously been selected by the user (or alternatively by the vehicle). In order to select a charging device/charging interface, information about a charging device or charging interface is received at the vehicle end via a WLAN communication link to the charging device at a sufficiently short distance from the charging device (e.g. 30 m). The driver then receives the information in the vehicle cockpit that a charging interface or charging device has been found, if appropriate with details of received information about the charging provider, the charging performance and a car park number of the charging device and can then select the charging interface for use.

The information about the position of the external charging interface 5 is received during the approach to the external charging interface 5. In the interrogation 160, after stopping it is checked whether position information is present via an external charging interface 5. Insofar as position information is present, it could optionally be checked that the position of the charging interface is known with sufficiently high confidence and/or precision to the parking assistance system, and only then is the position information used at all. Information about the confidence of the position information can be received, for example, together with the position information. It can then be checked, for example, that the respective confidence (i.e. the system-side confidence) or precision in relation to position information in a first dimension (e.g. longitudinal direction) and in relation to position information in a second dimension (e.g. lateral direction) is respectively greater than or greater than or equal to a specific threshold value.

Figure 4:
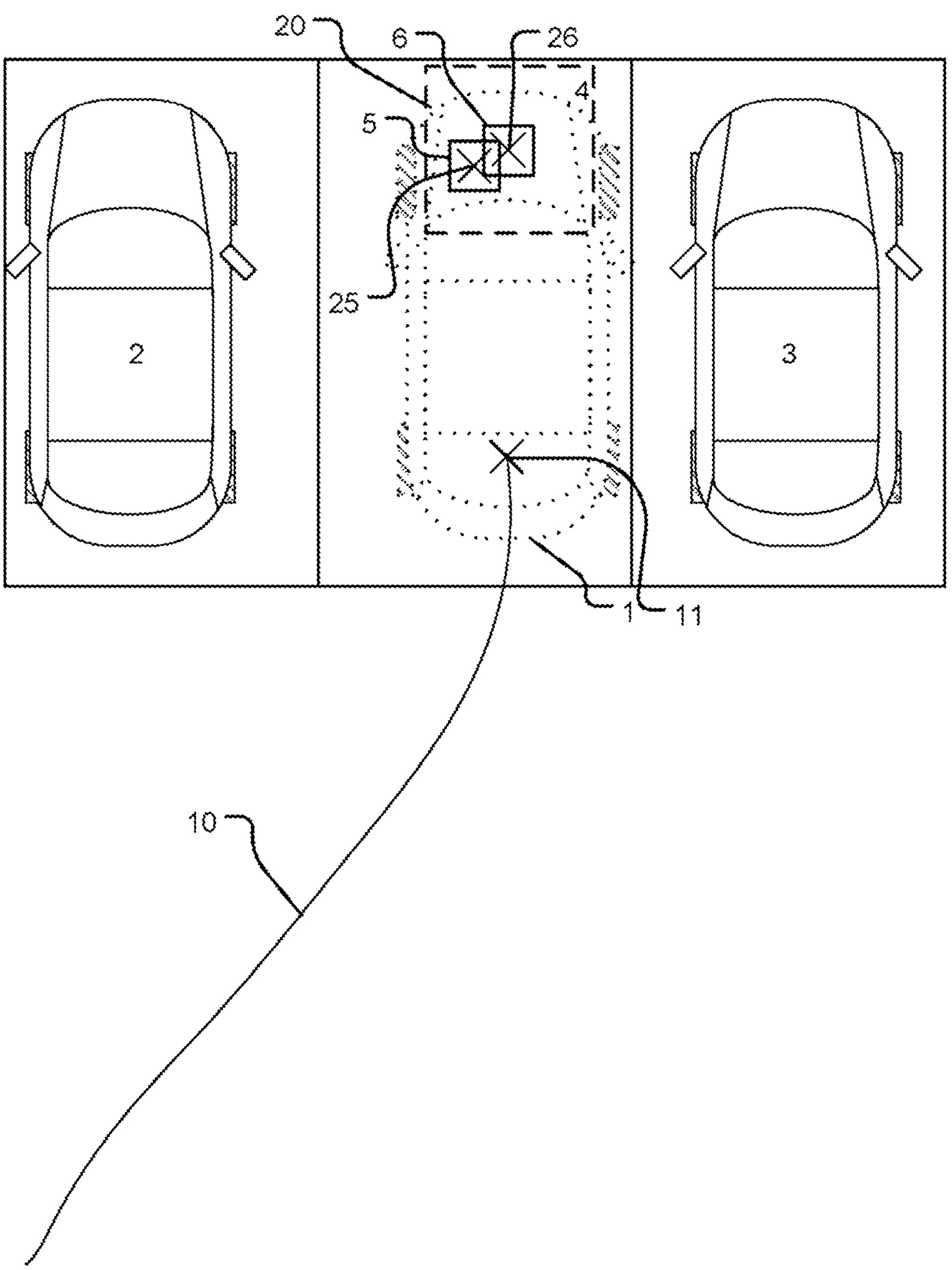
FIG. 4 shows a visualization relating to a first checking variant as to whether the setpoint target position is located in a defined surrounding area around the current target position.
Figure 5:
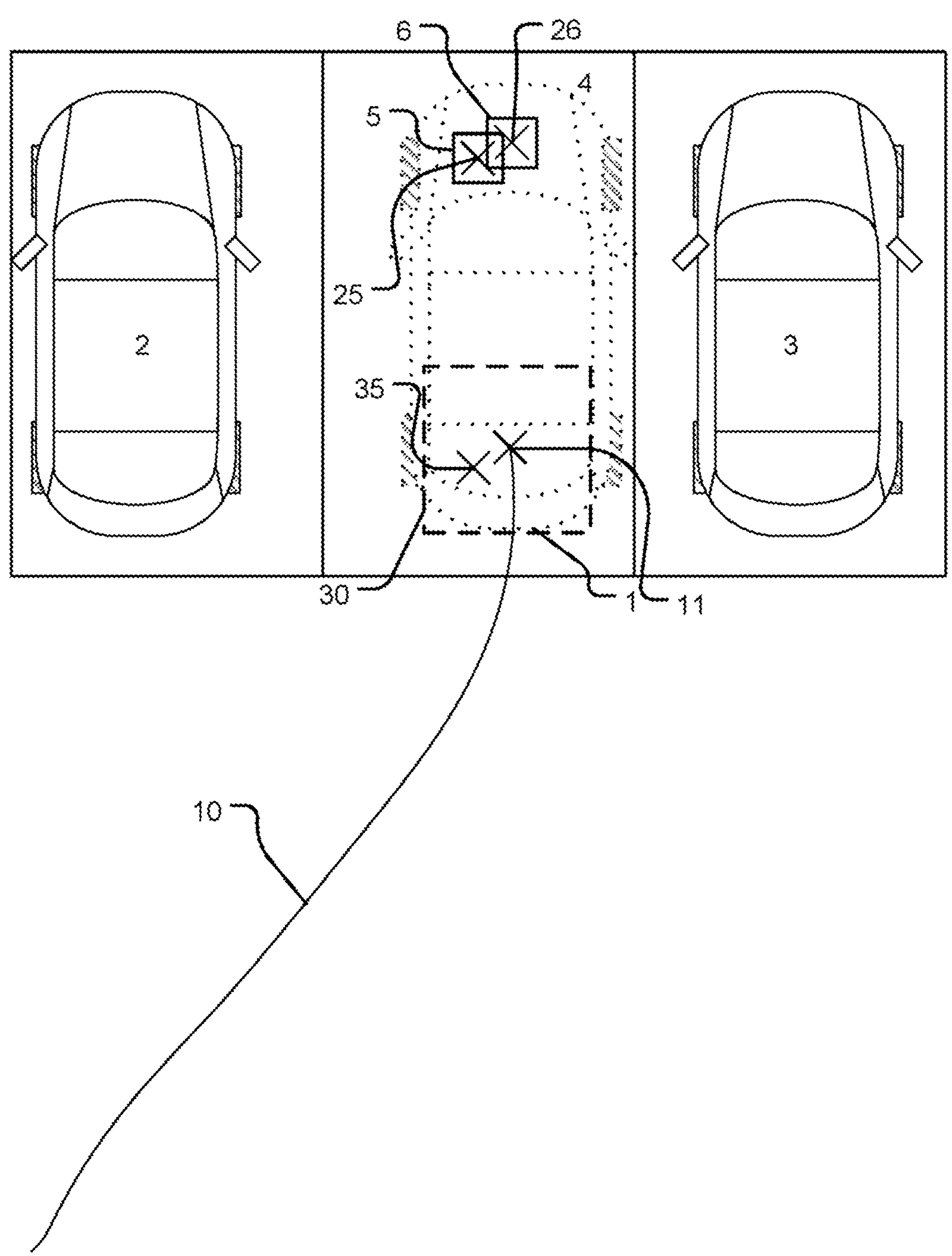
FIG. 5 shows a visualization relating to a second checking variant as to whether the setpoint target position is located in a defined surrounding area around the current target position.

In the interrogation 170, it is checked whether the setpoint target position is located in a defined area around an actual target position (alternatively it could also be checked whether the actual target position is located in a defined area around the setpoint target position). For the checking as to whether the setpoint target position is located in a defined surrounding area around the current target position, at least two embodiment variants are contemplated:

1. According to the first variant, the setpoint target position is the position of the vehicle-external charging interface 5 (e.g. ground coil) and the actual target position is the position of the vehicle-internal charging interface 6 (e.g. vehicle coil). In this case it can be checked whether the X-Y position of the vehicle-external charging interface 5 lies in a defined surrounding area 20 around the X-Y position of the vehicle internal charging interface 6. This is illustrated in FIG. 4, which shows the vehicle 1 with the vehicle-external charging interface 6 in the position after stopping. The reference number 25 marks the position of the vehicle-external charging interface 5 (here: the center of the ground coil), the reference number 26 marks the position of the vehicle-internal charging interface 6 (here: the center of the vehicle coil). In FIG. 4, the position 25 of the vehicle-external charging interface 5 is located in the defined surrounding area 20 around the position 26 of the vehicle-internal charging interface 6.
2. According to the second variant, the actual target position is the position of the reference point 11 of the vehicle 1 after stopping. The setpoint target position is a shifted position 35 of the vehicle-external charging interface 5 which is shifted by the offset between the position 26 of the vehicle-internal charging interface 6 and the reference position 11, as illustrated in FIG. 5. A shifted position 35 of the reference point 11, which is shifted by the offset between the position 26 of the vehicle-internal charging point 6 and the position 25 of the vehicle-external charging point 5, as a setpoint target position, is equivalent to this. In the second variant it is checked whether the shifted position 35 lies in a defined surrounding area 30 around the position of the reference point 11 of the vehicle 1.

Figure 6:
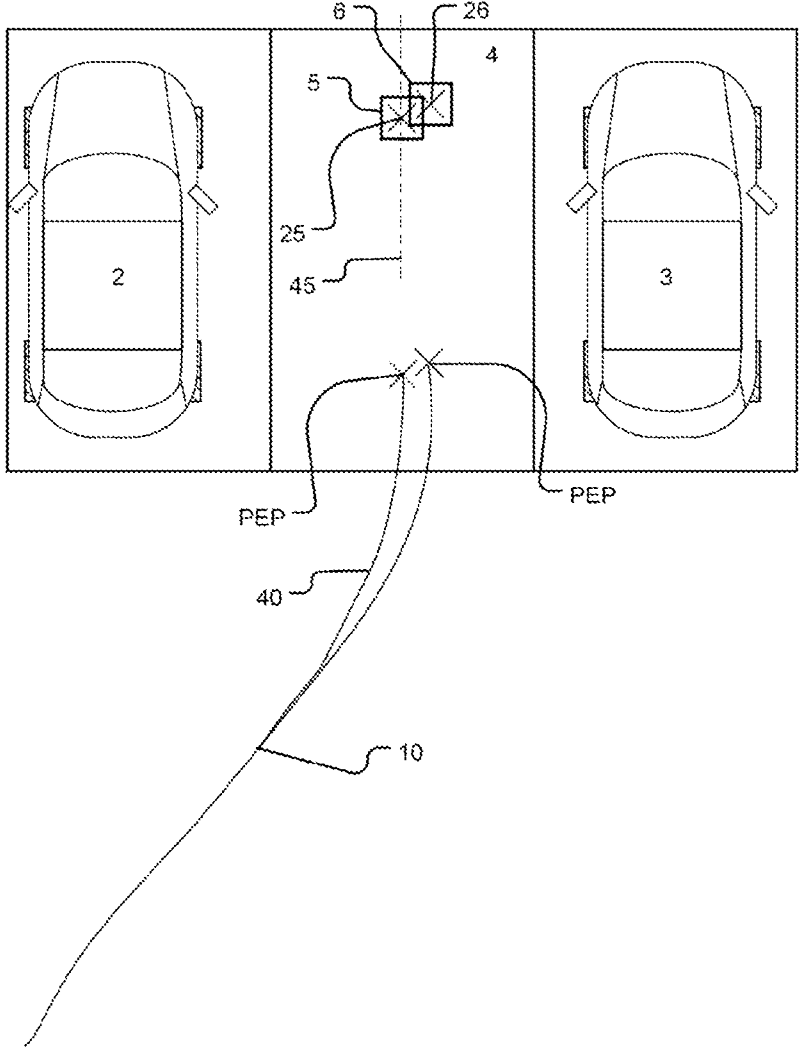
FIG. 6 shows an adapted driving trajectory.

If the checking 170 is positive, the driver is provided with an offer, via a user interface in the vehicle cockpit, to correct the actual target position and optionally also the actual target orientation in accordance with the setpoint target position or in accordance with the setpoint target orientation at the charging position. If the driver confirms this according to interrogation 190, in step 200 a trajectory 40, which is adapted in contrast to the trajectory 10 recorded in step 130, is determined with the corrected target position and optionally with a corrected target orientation based on the trajectory 10 recorded in step 130. For this purpose, for example the last x meters of the trajectory 10 (with x for example in the range from 3 to 5 m) are newly planned in accordance with the correction of the target position and target orientation. In the adapted trajectory 40, which is referred like the originally recorded trajectory 10 to the reference point 11 of the vehicle 1, the parking end position PEP of the trajectory 40 is shifted, in comparison with the trajectory 11 by the offset between the actual target position 26 and the setpoint target position 25, as illustrated in FIG. 6. In order to correct the target orientation, the trajectory can be adapted in such a way that, in the parking end position PEP, the vehicle longitudinal axis is as far as possible parallel to the predefined setpoint orientation at the charging position according to the straight line 45.

In step 210, the trajectory is reworked. In this context, for example obstacle information about obstacles in the surroundings (here, for example the two vehicles 2 and 3) is taken into account in order, for example, to ensure a sufficient distance from the obstacles according to the trajectory. In addition, the curvature profile and the speed profile of the trajectory are adapted in accordance with the requirements of the lateral guidance and longitudinal guidance insofar as this is necessary. The resulting trajectory is then stored in a non-volatile memory so that the latter is available even after a restart of the vehicle.

In the repetition process illustrated in FIG. 2, the driver moves the vehicle 1 into a position in which the system detects, on the basis of detected features of the surroundings, the earlier starting position near to the current position (see interrogation 300). A repetition of the stored driving trajectory is then offered to the driver via the user interface in the cockpit (see step 310), which offer can be accepted by the driver by means of a corresponding operator control action. After it has been detected in the interrogation 320 that the driver has accepted the offer, an adapted trajectory which allows for the shifted starting point (see step 330) is determined on the basis of the stored driving trajectory. In addition, possible changes in the surroundings are taken into account in the adapted trajectory. The vehicle is then guided successively with automated lateral and longitudinal guidance into the parking space 4 until the parking end position is reached according to the employed trajectory (see the interrogation 350) and the vehicle-internal charging interface 6 lies above the vehicle-external charging interface 5.

What is claimed is:

1. A driver assistance system for automatic maneuvering with at least automated lateral guidance for a motor vehicle, comprising:

the driver assistance system being operatively configured to:

determine a driving trajectory in a recording process based on a route which is manually driven along by a driver with the motor vehicle, and maneuver the motor vehicle with at least automated lateral guidance in a repetition process based on the previously determined driving trajectory, wherein:

the driving assistance system is further operatively configured:

(i) in the recording process to:

detect, at the end of the manually driven-along route, the presence of a setpoint target position of the motor vehicle, or receive, at the end of the manually driven-along route, via a user interface, information about the setpoint target position of the motor vehicle, and (ii) to maneuver the motor vehicle with at least automated lateral guidance in the repetition process such that, at the end of the repetition process, an actual target position of the motor vehicle is at the setpoint target position, and wherein the driver assistance system is further operatively configured:

to detect, in the recording process at the end of the manually driven-along route, that the setpoint target position is located in a defined surrounding area around the actual target position, or that the actual target position is located in the defined surrounding area around the setpoint target position.

2. The driver assistance system according to claim 1, wherein the driver assistance system is configured to determine, in the recording process while taking into account the setpoint target position, such a driving trajectory that, at the end of the repetition process, the actual target position of the motor vehicle is at the setpoint target position.

3. The driver assistance system according to claim 1, wherein the defined surrounding area is defined, by an offset in the vehicle longitudinal direction, as being less than or less than or equal, in terms of absolute value, to a first threshold value, and by an offset in the vehicle lateral direction as being less than or less than or equal, in terms of absolute value, to the first threshold value or to a second threshold value.

4. The driver assistance system according to claim 1, wherein the setpoint target position is a setpoint target position for positioning the motor vehicle on a vehicle-external charging interface of a vehicle-external charging device.

5. The driver assistance system according to claim 4, wherein the vehicle external charging interface is an inductive charging interface or a charging interface with charging robotics.

6. The driver assistance system according to claim 4, wherein:

the setpoint target position is the position of the vehicle-external charging interface, and the actual target position is the position of a vehicle-internal charging interface, or the actual target position is a position of a reference point of the vehicle, and (i) the setpoint target position is the shifted position of the reference point, which position is shifted by the offset between the position of the vehicle-internal charging interface and the position of the vehicle-external charging interface, or (ii) the setpoint target position is a shifted position of the vehicle-external charging interface which is shifted by the offset between the position of the vehicle-internal charging interface and the position of the reference point.

7. The driver assistance system according to claim 1, wherein the driver assistance system is further configured to:

offer adaptation to the setpoint target position to the user via a user interface, and detect the user-side acceptance of the offer of adaptation to the setpoint target position.

8. A method for the automated maneuvering of a motor vehicle with at least automated lateral guidance, comprising:

determining, in a recording process, a driving trajectory based on a route which is manually driven along by a driver with the motor vehicle; and in a repetition process, maneuvering the motor vehicle based on the previously determined driving trajectory with at least automated lateral guidance, wherein the method further comprises:

(i) in the recording process, detecting, at the end of the manually driven-along route, the presence of a setpoint target position of the motor vehicle, or receiving, at the end of the manually driven-along route, information about the setpoint target position of the motor vehicle, and (ii) maneuvering the motor vehicle in the repetition process with at least automated lateral guidance such that, at the end of the repetition process, an actual target position of the motor vehicle is at the setpoint target position, and wherein the method further comprises:

detecting, in the recording process at the end of the manually driven-along route, that the setpoint target position is located in a defined surrounding area around the actual target position, or that the actual target position is located in the defined surrounding area around the setpoint target position.

9. A computer product comprising a non-transitory computer readable medium having stored therein program code which when executed, carries out the method according to claim 8.

* * * * *